United States Patent [19]

Moschel

[11] Patent Number: 4,897,905
[45] Date of Patent: Feb. 6, 1990

[54] CONTROLLED DEFLECTION ROLL USING INERT GASSES AND INDEPENDENT LUBRICATION SYSTEM

[75] Inventor: Charles C. Moschel, Roscoe, Ill.

[73] Assignee: Beloit Corporation, Beloit, Wis.

[21] Appl. No.: 308,921

[22] Filed: Feb. 13, 1989

[51] Int. Cl.$^4$ .............................................. B21B 27/06
[52] U.S. Cl. ........................................ 29/116.2; 29/132
[58] Field of Search ................... 29/116.1, 116.2, 110, 29/132; 72/243, 245; 162/205, 206, 207

[56] References Cited

U.S. PATENT DOCUMENTS

| | | |
|---|---|---|
| 3,726,338 | 4/1973 | Sorenson . |
| 4,117,706 | 10/1978 | Lami ........................................ 72/245 |
| 4,282,638 | 8/1981 | Christ et al. . |
| 4,282,639 | 8/1981 | Christ et al. . |
| 4,299,162 | 11/1981 | Hartman et al. ............... 29/116.2 X |
| 4,307,501 | 12/1981 | Ahrweiler ...................... 29/116.2 X |
| 4,402,207 | 9/1983 | Buder ............................... 72/245 X |
| 4,679,287 | 7/1987 | Allard . |

FOREIGN PATENT DOCUMENTS 2158196 11/1985 United Kingdom .............. 29/116.2

OTHER PUBLICATIONS

Chemical Engineering, Philip Blakey & Gary Orlando, "Using Inert Gases for Purging, Blanketing and Transfer", May 28, 1984 pp. 94-102.

Primary Examiner—Joseph M. Gorski
Assistant Examiner—Peter D. B. Vo
Attorney, Agent, or Firm—Dirk Veneman; Raymond Campbell; Gerald Mathews

[57] ABSTRACT

Apparatus for controlling the oxygenation of both the bearing lubrication oil and the hydraulic oil used for actuating the roll shell support elements in a controlled deflection roll, such as used in the papermaking industry, includes a seal at either end of the controlled deflection roll which establishes a gas-impervious seal between the roll shell support and rotation bearings at either end of the roll and the interior of the roll. A source of pressurized inert gas is linked to both the interior of the roll and to the reservoir of hydraulic oil used to actuate the roll shell support shoes. This prevents oxygen from interfacing with the hydraulic oil at the only two points in the closed system where the hydraulic oil and the atmosphere would otherwise come into contact. A separate bearing oil lubrication system having its own reservoir is maintained to supply bearing lubricant to the bearings and return it to a sump while maintaining the bearing lubricant separate from the hydraulic oil.

2 Claims, 1 Drawing Sheet

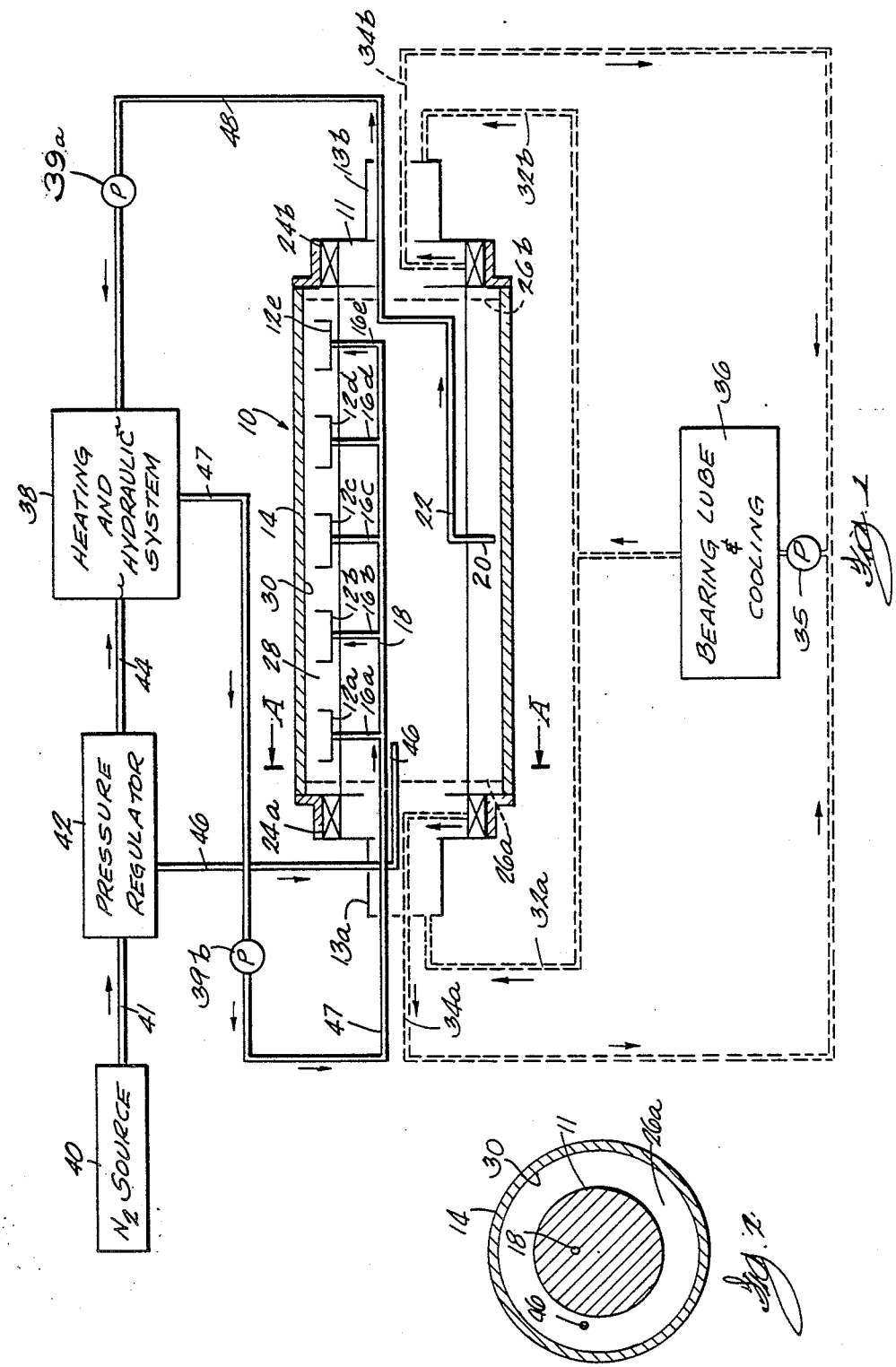

CONTROLLED DEFLECTION ROLL USING INERT GASSES AND INDEPENDENT LUBRICATION SYSTEM

BACKGROUND OF THE INVENTION

This invention relates to a controlled deflection roll such as is used in the papermaking industry for establishing nipping contact with a mating roll. More particularly, this invention relates to a method and apparatus for virtually eliminating contact between the hydraulic oil used to actuate the roll shell support elements, commonly called shoes in the industry, and the atmosphere. Still more particularly, this invention relates to the separation of the hydraulic oil used to actuate the roll shell support element from the oil used to lubricate the roll bearings.

In prior, and current, controlled deflection rolls, the hydraulic fluid, which is a petroleum based oil, is introduced to the interface between the roll shell support shoes and the cylindrical inner surface of the roll shell either hydrostatically, through capillary tubes extendingfrom beneath the pistons providing the supporting force beneath the shoes through the shoe to the interface, or is supplied to the inner surface of the roll shell to provide hydrodynamic force when the oil being carried along the inner surface of the roll shell is wedged between the leading edge of the shoe and the roll shell to establish a hydrodynamic film, and roll shell supporting pressure, between the shoe and the roll shell.

The deleterious effect of exposing petroleum based lubricants to the atmosphere, particularly at elevated temperatures, is well-known. Also known is the desirability of heating and cooling the hydraulic oil used to provide the deflection compensating force within a controlled deflection roll, such as used in the papermaking industry, and the oil used to lubricate the bearings in such rolls. Examples of such prior art is shown and described in U.S. Pat. Nos. 4,282,638; 4,282,639 and 4,679,287. The selective heating and cooling of the bearing lubrication and roll shell support oil requires these lubricants to be circulated between the interior of the roll and exterior heating, cooling and pumping equipment. In order to provide this recirculation of these oils, they must be collected within the interior of the roll shell and conducted out of the shell through suitable conduits. Since the interior of a controlled deflection roll is relatively large in diameter, there is a relatively large interface between the atmospheric air within the roll and the pool of bearing oil and/or support element (shoes) actuating oil. Accordingly, over a relatively short period of time, depending on oil temperature and the size of the interface between the atmosphere and the oil, the lubricants become oxidized, begin to lose their lubricating properties, and deposit solid deleterious material on system components.

SUMMARY OF THE INVENTION

The problems associated with the oxygenation and break-down of the lubricating properties of the bearing lubrication oil and/or roll shell support element lubrication oil are mitigated by this invention. Atmospheric air is excluded from the interior of the controlled deflection roll. In addition, both the bearing lubrication oil and the roll shell support element lubrication oil are conducted through closed loops within and outside the roll where they are heated and cooled, as desired. Oil within the roll is exposed only to an inert gas, such as nitrogen, to prevent its oxygenation and extend its useful life.

The bearing lubrication oil is introduced at either end of the roll to the bearings and is withdrawn from the bearings at the same end it is introduced. The roll shell supporting hydraulic oil, which is supplied either hydrostatically or hydrodynamically to the interface between the support elements (shoes) and the inner surface of the roll shell, is introduced at one end of the roll and the oil passing from these support elements to the interior of the roll shell is gathered and conducted out the other end of the roll. A source of pressurized inert gas, such as nitrogen, is introduced to the interior of the roll shell and is prevented from migrating out of the roll by a seal at either end of the roll shell intermediate the bearings and their respective ends of the roll shell. This seal also prevents the bearing lubrication oil from entering the interior of the roll and mixing with the hydraulic oil used to actuate the support elements. The bearing lubrication oil thus has minimal contact with air within the bearings, and the hydraulic oil has no contact with air within the roll because air is excluded from within the roll; nor does the hydraulic oil have any contact with the bearing lubrication oil. Thus, incompatible fluids may be used for the two functions if it is deemed advantageous.

The bearing lubrication oil could be introduced at one end for both bearings and withdrawn at the other end for both bearings. This alternative would merely require two additional sealed conduits through the seal at either end of the roll.

Accordingly, it is an object of this invention to provide a method and apparatus for lubricating the roll shell support elements in a controlled deflection roll while minimizing the oxygenation of the lubrication oils.

Another object of this invention is to provide a method and apparatus for separating the bearing lubrication oil from the roll shell support element oil in a controlled deflection roll while retarding the oxidation of these oils.

Still another objection of this invention is to provide a method and apparatus for maintaining an inert gas within a controlled deflection roll to retard oxygenation of the roll shell support element oil within the roll.

These and other objects, features and advantages of this invention will be readily apparent to those skilled in the art upon reading the description of the preferred embodiment in conjunction with the attached drawing.

IN THE DRAWING

FIG. 1 is schematic drawing of a controlled deflection roll showing the separate bearing lubrication and roll shell support element hydraulic oil lubrication systems; and FIG. 2 is an elevational section view along the section A—A in FIG. 1.

DESCRIPTION OF THE PREFERRED EMBODIMENT

As shown in FIG. 1, a controlled deflection roll 10 has a plurality of support elements 12 disposed beneath the rotatable roll shell 14 to provide support and deflection control to the roll shell to control the amount of force applied to the nip and the profile of the nip line of contact of the roll 10 and a mating roll, not shown. The roll has a shaft 11 extending through the roll shell and support elements 12 are mounted in this shaft. Journals 13a,13b extend outwardly on either end of the shaft to support the roll in a frame, not shown.

In this description, corresponding structural elements are correspondingly numbered with different letter subscripts to differentiate between them.

In the embodiment shown, the roll shell support and deflection control element comprise a plurality of axially spaced individual shoes 12a,12b,12c,12d and 12e, each of which contains one or more vertically disposed capillary-type riser tubes 16 which are connected to one or more hydraulic conduits 18 extending into the interior of the roll through one end thereof. In this embodiment, the capillary tubes 16 extend through the hydrostatically actuated type of individual shoes 12 to hydraulically link the shoe faces with the hydraulic conduit 18. The support element may comprise a single shoe extending longitudinally for substantially the length of the roll shell beneath the working face length thereof. Such support element arrangements, and the hydrostatic and hydrodynamic manner of providing the hydraulic lubricating oil to lubricate their interface with the inner surface of the roll shell, are well-known in the industry and, accordingly, will not be discussed further.

Sump inlet 20 is fluidly linked with a hydraulic outlet conduit 22 for gathering and removing hydraulic oil from the interior of the roll through one or the other ends of the support shaft 11. As shown in FIG. 1, this outlet 22 is at the end of the roll opposite from inlet conduit 18.

The roll shell 14 is rotatably supported on the stationary roll shaft 11 by bearings 24a,24b at either end of the roll shell. A seal 26a,26b is disposed between the support shaft 11 and the inner surface 30 of the roll shell on the inner side of the bearings at either end of the roll shell to establish a fluid impermeable seal between the interior space 28 of the roll and the bearings. The seal 26a,26b may be made of metal or a resilient material resistant to the oils and hydraulic fluids used in the roll. It needs only to be sealed against the stationary roll shaft and have its annular outer edge in sealing engagement with the rotating inner surface of the roll shell. Such sealing, sliding engagement can be accomplished in any of several known ways. The interior space 28 is thus bounded by seals 26a,26b, the roll shaft and the inner surface 30 of the roll shell. A bearing is mounted on the shaft at either end of the roll and the roll shell is in turn mounted on the outer race of the bearing so that the seals 26a,26b establish a fluid (i.e. gas and liquid) impermeable seal between the bearings and the interior space 28 of the roll. A hydraulic fluid inlet conduit 32a,32b is located within the end journal on either end of the roll to conduct lubricating oil to the bearings 24a,24b at either end of the roll. Similarly, a hydraulic fluid outlet conduit 34a,34b is linked with its corresponding bearing 24a,24b at either end of the roll to conduct lubricating oil from the bearings.

A bearing lubricating oil cooling apparatus 36 is fluidly linked with the bearing oil inlet and outlet conduits 32,34 to establish a completely closed system to circulate the bearing oil into and out of the bearings and through the cooler to maintain a desired temperature of the bearing lubrication oil. This is powered by pump 35.

Similarly, a heating apparatus 38 is fluidly linked with the conduits conveying hydraulic oil into and out of the roll for actuating the roll shell support elements. Pump 39a removes hydraulic oil from the roll, and pump 39b supplies pressurized oil to the support elements. Upstream of the heating apparatus 38, is a source 40, such as a pressurized tank, of inert gas, such as nitrogen, which is fluidly linked by a tube 41 to a pressure regulator 42. Separate outlet conduits 44,46 from the pressure regulator lead to the heating apparatus 38 and to the interior space 28 of the roll, respectively. Thus, the inert gas is supplied directly to the interior of the roll between the seals 26a,26b. This is also seen clearly in FIG. 2. The same inert gas is supplied to the heating apparatus to prevent, or at least retard, oxidation of the oil as it is heated. This heated oil is then directed into the end of the journal via conduit, or tube, 47. Similarly, used oil is returned to the heating and pumping apparatus via sump inlet 20 and internal conduit 22 connected to return conduit 48.

In operation, nitrogen is supplied to the pressure regulator 42 which, in turn, supplies inert gas to the heating and pumping apparatus 38 and to the interior space 28 of the roll, thus providing an inert gaseous atmosphere to the interior of the roll between seals 26a,26b and displacing the oxygen from the interior space. The heating and pumping apparatus 38 supplies heated hydraulic oil through an inlet conduit 47 which in turn supplies oil to internal conduit 18 to actuate the roll shell support elements 12 and lubricate their interface with the inner surface of the roll in a known manner.

The bearing housings in which the bearings 24a,24b are mounted have very little free interior space around the bearings, especially as compared to the interior space 28 of the roll. Mainly, this space is between the individual roller or ball bearing elements themselves. Thus, the bearing lubrication oil entering and leaving through conduits 32,34 is not exposed to atmospheric air to any great extent. This minimal exposure to air, coupled with the bearing lubrication oil being cycled through the cooling and pumping apparatus 36 results in a longer useful life for the bearing lubrication oil. While the inner space 28 of the controlled deflection roll is much more voluminous than the free space in the bearing housings, the inert gas, preferably nitrogen, displaces the atmospheric air in the interior of the roll so that the hydraulic oil used to actuate the roll shell support elements has its oxidation retarded and minimized. This allows the roll shell support oil to be heated in the heating and pumping apparatus 38 to provide optimum lubricating qualities and heated process operation without promoting or accelerating the deterioration of the oil due to exposure to oxygen at higher operating temperatures. The seals 26a,26b have been described as being gas and liquid impermeable. However, it is anticipated, and within the scope of the invention, that these seals can pass pressurized gas outwardly from within the interior space 28 of the roll under the greater pressure of the pressurized inert gas introduced into the roll. The important aspect from the standpoint of gaseous impermeability of seals 26a,26b is concerned is that no air can pass them going inwardly into space 28. Some gas also passes outwardly through the sump inlets 20 and out of the roll outlet return conduit 48, but it returns to the pumping apparatus 38 and is not wasted. In addition, a connection between the roll interior and the pumping apparatus 38 may be used to facilitate the easy flow of inert gas between the two components.

Accordingly, a method and apparatus for optimizing the use of bearing lubrication oil and retarding and minimizing the oxidation of the roll shell support element actuating oil, in a controlled deflection roll has been set forth which achieves the stated objectives.

What is claimed is:

1. In a controlled deflection roll having a support shaft, a roll shell, bearings disposed about each end of the support shaft about which the roll shell is rotatably mounted, support element means mounted on the support shaft in a space between the support shaft and the inner surface of the roll shell in controlled supporting engagement therewith, the combination comprising:

seal means interposed between the bearings and the roll shell at each end of the support shaft to establish a fluid impermeable barrier between the interior space of the roll and the bearings;

bearing lubrication means in fluid communication with the bearings, said bearing lubrication means including a closed fluid loop and bearing pump means for conducting lubricant into and out of the bearings;

support element hydraulic means in fluid communication with the support element means, said support element hydraulic means including hydraulic pump means and a closed fluid loop for conducting hydraulic oil from outside the roll to the support element means and for conveying the hydraulic oil out of the interior of the roll;

heating means for heating the hydraulic oil in the closed fluid loop;

inert gas support means in fluid communication with (1) the interior space of the roll for supplying an inert gas to the interior of the roll between the seal means to establish and maintain an inert atmosphere within the roll, and (2) the means for heating the hydraulic oil;

the closed fluid loop of the bearing lubrication means and closed fluid loop of the support element hydraulic means are independent and separate from each other.

2. In a controlled deflection roll having a support shaft, a roll shell, bearings disposed about each end of the support shaft about which the roll shell is rotatably mounted, support element means mounted on the support shaft in a space between the support shaft and the inner surface of the roll shaft in controlled supporting engagement therewith, the combination comprising:

seal means interposed between the bearings and the roll shell at each end of the support shaft to establish a fluid impermeable barrier between the inner space of the roll and the bearings;

bearing lubrication means in fluid communication with the bearings, said bearing lubrication means including a closed fluid loop and bearing pump means for conducting lubricant into and out of the bearings;

support element hydraulic means in fluid communication with the support element means, said support element hydraulic means including hydraulic pump means and a closed fluid loop for conducting hydraulic oil from outside the roll to the support element means and for conveying the hydraulic oil out of the interior of the roll;

heating means for heating the hydraulic oil in the closed fluid loop;

inert gas source means in fluid communication with (1) the interior space of the roll for supplying an inert gas to the interior of the roll between the seal means to establish and maintain an inert atmosphere within the roll, and (2) the means for heating the hydraulic oil;

pressure regulator means in downstream fluid communication with the inert gas source means, and in fluid communication with (1) the heating means for heating the hydraulic oil, and (2) the interior space of the roll, so that the inert gas is separately supplied to the hydraulic oil heating means and directly to the interior space of the roll.

* * * * *